(12) United States Patent
Shin et al.

(10) Patent No.: US 10,139,676 B2
(45) Date of Patent: Nov. 27, 2018

(54) LIGHT CONVERSION DEVICE AND DISPLAY APPARATUS COMPRISING THE SAME

(71) Applicant: LG CHEM, LTD., Seoul (KR)

(72) Inventors: Du Hyeon Shin, Daejeon (KR); Dong Wook Lee, Daejeon (KR); Jungho Lim, Daejeon (KR); Soojung Yeo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/637,161

(22) Filed: Jun. 29, 2017

(65) Prior Publication Data

US 2018/0004041 A1    Jan. 4, 2018

(30) Foreign Application Priority Data

Jun. 29, 2016    (KR) .................... 10-2016-0081986

(51) Int. Cl.
*G02F 1/1335*    (2006.01)

(52) U.S. Cl.
CPC .. *G02F 1/133603* (2013.01); *G02F 1/133606* (2013.01); *G02F 1/133621* (2013.01); *G02F 2001/133614* (2013.01); *G02F 2001/133624* (2013.01); *G02F 2202/02* (2013.01); *G02F 2202/04* (2013.01)

(58) Field of Classification Search
CPC ......... G02F 1/133603; G02F 1/133606; G02F 1/133621; G02F 2001/133614; G02F 2001/133624; G02F 2202/02; G02F 2202/04
See application file for complete search history.

(56) References Cited

U.S. PATENT DOCUMENTS

| | | | | |
|---|---|---|---|---|
| 9,181,476 B2 * | 11/2015 | Izawa | ................ | C09K 11/7741 |
| 9,632,229 B2 * | 4/2017 | Yamada | ................ | G02B 6/005 |
| 2015/0330602 A1 * | 11/2015 | Yonemoto | ............ | C09K 11/703 |
| | | | | 349/71 |
| 2016/0161066 A1 * | 6/2016 | Sung | ..................... | H01L 33/502 |
| | | | | 362/84 |
| 2016/0349573 A1 * | 12/2016 | Ohmuro | ................ | G02F 1/1336 |
| 2017/0115529 A1 * | 4/2017 | Kim | .................. | G02F 1/133603 |
| 2017/0373229 A1 * | 12/2017 | Shin | ........................ | H01L 33/50 |

* cited by examiner

*Primary Examiner* — Seung H Lee
(74) *Attorney, Agent, or Firm* — Dentons US LLP

(57) ABSTRACT

The present application relates to a light conversion device, a backlight unit and a display apparatus.

9 Claims, 3 Drawing Sheets

[Fig. 1]
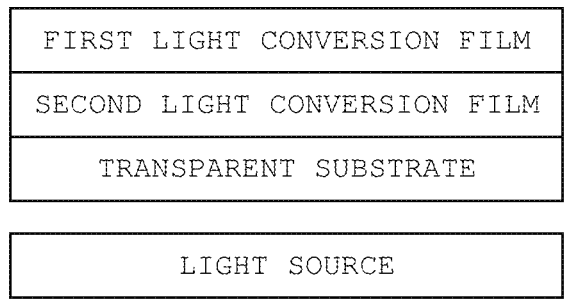
[Fig. 2]
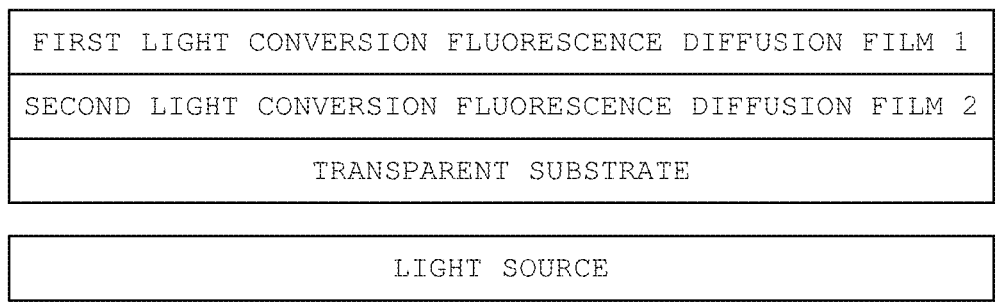
[Fig. 3]
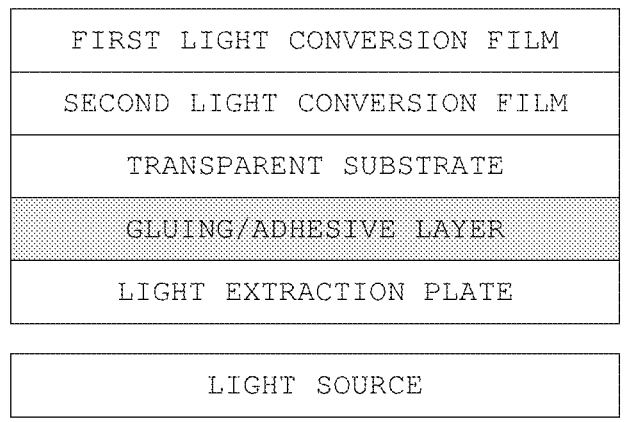

[Fig. 4]
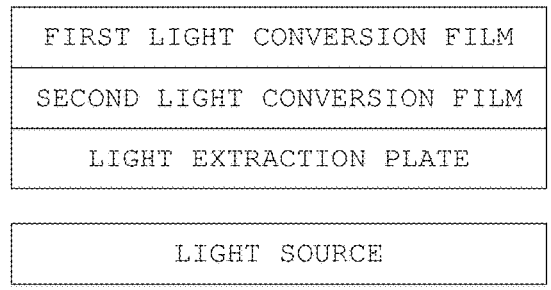
[Fig. 5]
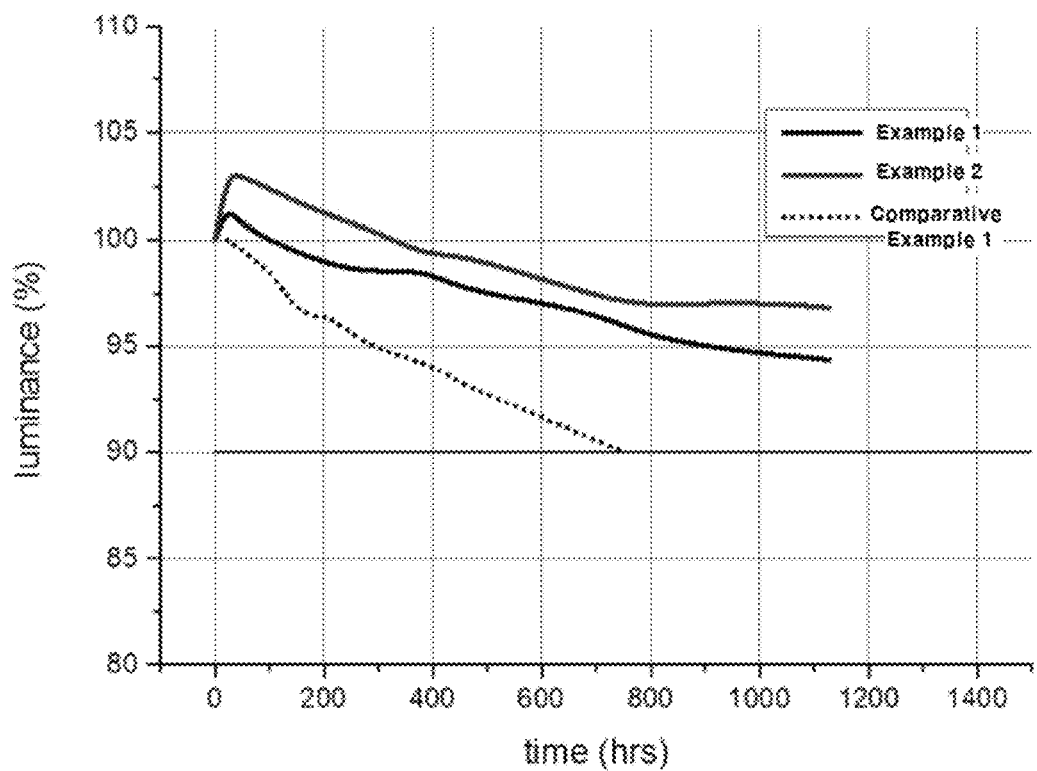

[Fig. 6]
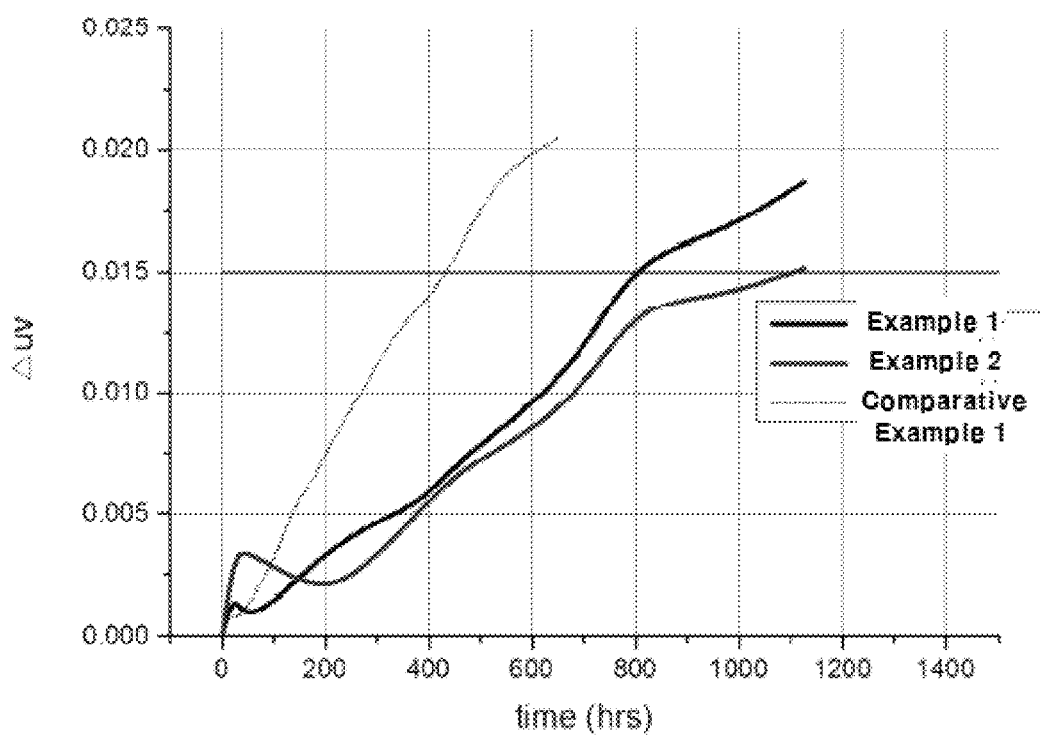

LIGHT CONVERSION DEVICE AND DISPLAY APPARATUS COMPRISING THE SAME

This application claims priority from Korean Patent Application No. 10-2016-0081986 filed on Jun. 29, 2016, the disclosure of which is incorporated by reference in its entirety as if fully set forth herein.

FIELD OF THE INVENTION

The present specification relates to a light conversion device and a display apparatus.

BACKGROUND OF THE INVENTION

Fluorescent substances are generally a light emitting material emitting light with a unique wavelength by absorbing energy in the form of light or electricity from the outside, and may be divided into inorganic fluorescent substances, organic fluorescent dyes, nanocrystal fluorescent substances and the like depending on the components forming the fluorescent substance and light emission mechanism.

Recently, attempts to modify a spectrum of a light source using such fluorescent substances have been diversely made. This relates to a fluorescent substance absorbing some of specific wavelengths of light coming out of a light source, converting this to light with a longer wavelength in a visible region and emitting the light, and depending on light emission properties of the fluorescent substance, brightness, color purity, color gamut and the like of the emitted light may be greatly enhanced.

An inorganic fluorescent substance is formed with a parent such as a sulfide, an oxide or a nitride, and activator ions, and may be used in high-quality display apparatuses since physical and chemical stability is excellent and high color purity is reproduced, however, there are disadvantages in that the fluorescent substance is very high-priced, has low light emission efficiency, and particularly, development of the fluorescent substance excited and emitting light in a near ultraviolet or blue region of 400 nm or higher is limited.

In a nanocrystal fluorescent substance formed with groups II to IV or groups III to V semiconductor particles having a few nanometer size, the fluorescence wavelength becomes different depending on the particle size unlike an organic fluorescent dye, and as the particle size decreases, light with a shorter wavelength emits, and a visible region having a target wavelength may all be expressed by controlling the size. In addition, the nanocrystal fluorescent substance has a larger extinction coefficient than general organic dyes by 100 times to 1000 times and also has high quantum efficiency, and thereby generates very strong fluorescence. Particularly, the nanocrystal fluorescent substance observes only a transition from a ground vibration state of a conduction band to a ground vibration state of a valence band, and as a result, the fluorescence wavelength mostly shows monochromatic light. However, there are disadvantages in that high raw material costs make it difficult to secure price competitiveness, and the fluorescent substance is weak against heat or oxygen.

On the contrary, an organic fluorescent dye has diverse light emission spectra compared to the inorganic fluorescent substances, has excellent quantum efficiency, and particularly has an advantage of being low-priced, and therefore, is well worth being used in a light conversion device. However, for increasing conversion efficiency of light passing through the organic fluorescent dye and intensity of the converted light, the concentration needs to be increased, and in this case, extinction caused by the concentration may not be avoided, and particularly, stability against heat or light is known to decrease.

SUMMARY OF THE INVENTION

Embodiments of the present disclosure are directed to providing, in forming a backlight of a liquid crystal display apparatus, a method for manufacturing a light conversion device obtaining white light by using a blue light emitting diode as a light source, and changing some of the blue light to green or red, or green and red using at least one or more organic fluorescent dyes.

Particularly, the present disclosure is directed to providing a method for stably driving a backlight of a liquid crystal display apparatus while providing a wide color gamut property to the backlight in high efficiency.

The present disclosure is also directed to providing a method for manufacturing an illumination apparatus having high color rendering in addition to the liquid crystal display apparatus.

In view of the above, one embodiment of the present disclosure provides a light conversion device including a light source; and a light conversion film provided on one surface of the light source, wherein the light conversion film includes a wavelength converting material converting a wavelength of light emitted from the light source and a light transmitting polymer resin in which the wavelength converting material is dispersed, and the light conversion film is formed with two or more layers and each of the layers independently has a different maximum light emission wavelength.

Another embodiment of the present disclosure provides a light conversion device further including a transparent substrate or a light extraction plate on a surface of the light conversion film facing the light source according to one embodiment of the present disclosure.

Still another embodiment of the present disclosure provides a backlight unit including the light conversion device according to one embodiment of the present disclosure.

Yet another embodiment of the present disclosure provides a display apparatus including the backlight unit according to one embodiment of the present disclosure.

BRIEF DESCRIPTION OF THE DRAWINGS

FIG. 1 to FIG. 3 illustrate a lamination structure of a light conversion device according to embodiments of the present application.

FIG. 4 illustrates a lamination structure of a light conversion device comprising the light extraction plate of the present application.

FIG. 5 and FIG. 6 are graphs showing the results of light-fastness stability for luminance and changes in the chrominance of the present application.

DETAILED DESCRIPTION OF THE EMBODIMENTS

Hereinafter, embodiments of the present disclosure will be described in more detail with reference to accompanying drawings.

One embodiment of the present disclosure provides a light conversion device including a light source; and a light conversion film provided on one surface of the light source, wherein the light conversion film includes a wavelength converting material converting a wavelength of light emitted from the light source and a light transmitting polymer resin in which the wavelength converting material is dispersed, and the light conversion film is formed with two or more layers and each of the layers independently has a different maximum light emission wavelength.

The wavelength converting material is, for example, a material absorbing light coming out of a blue light source, that is, energy, and converting the light to light with a longer wavelength than the blue light source (visible ray), which is light having lower energy.

The light transmitting polymer resin is similar to a transparent optical film used in LCD displays, and is a resin capable of filming through UV curing, thermal curing, drying and the like by being coated on many various substrates.

The light conversion film formed in a structure of two or more layers having different maximum light emission wavelengths according to one embodiment of the present application converts light entered from a blue light emitting diode light source in higher efficiency, and thereby significantly enhances light-fastness reliability of an organic fluorescent dye through suppressing active oxygen generation.

An organic fluorescent material excited by light mostly forms singlet excitons, however, very few forms triplet excitons. Herein, the triplet excitons may again excite oxygen molecules around them. The reason for such a phenomenon is that oxygen in a stable state has a triplet state electron form and is very efficiently excited by triplet excitons present close by with higher energy.

In addition, oxygen excited as above has a singlet oxygen form, and singlet oxygen is very reactive readily destroying surrounding molecules. For example, organic materials emitting green fluorescence produce singlet oxygen by some triplet excitons reacting with surrounding oxygen, while producing green fluorescence by absorbing blue light having a shorter wavelength. Accordingly, excitation of the fluorescent material caused by light in a visible region forms very reactive singlet oxygen to destroy itself. An opportunity to produce singlet oxygen is reduced when an organic material absorbing green light and capable of quickly emitting as red fluorescence is around, and an effect of enhancing light fastness may be obtained.

In addition, although not particularly limited thereto, the light source may be a blue light emitting diode emitting blue light.

In addition, the light conversion film in the embodiment may absorb some of light entered from a blue light emitting diode, convert the light to green or red, or green and red having high purity in high efficiency, and emit the result.

The light conversion film according to one embodiment of the present application is excited by light emitted from the light source, and has two layers formed with a first light conversion film having a maximum light emission wavelength from 500 nm to 550 nm and a second light conversion film having a maximum light emission wavelength from 600 nm to 660 nm.

In addition, the light conversion film is not limited to a two-layer structure and may be formed with three layers. When formed with three layers, the light conversion film may be formed with first, second and third light conversion films in the order of increasing a maximum light emission wavelength.

Another embodiment of the present application provides a light conversion film, wherein the wavelength converting material includes at least one of an organic fluorescent dye and an organic fluorescent pigment derived from an organic fluorescent dye, and a wavelength of light converted by the wavelength converting material has a full width at half maximum (FWHM) of 60 nm or less.

The wavelength converting material is selected from among those having a narrow full width at half maximum and high quantum efficiency, and specifically, may be an organic fluorescent dye. The wavelength converting material may also be an organic fluorescent pigment including an organic fluorescent dye selected from among those having a narrow full width at half maximum and high quantum efficiency. Herein, the organic fluorescent pigment may have an average particle size of $0.05$ $\mu m \leq d50 \leq 10$ $\mu m$. Herein, the organic fluorescent pigment refers to a fine particulate organic compound that is not dissolved in water or a solvent, and is a solid solution of a synthetic resin made by uniformly dissolving and solidifying an organic fluorescent dye. As the synthetic resin that becomes a carrier of the organic fluorescent dye, a copolymer of an acrylic resin, an alkyd resin, an amido resin, a urea resin, a melamine resin, a benzoguanamine resin and the like may be used.

One embodiment of the present application provides a light conversion device further comprising a transparent substrate or a light extraction plate on a surface of the light conversion film facing the light source.

FIG. 1 illustrates a lamination structure of the light conversion device according to one embodiment of the present application. According to FIG. 1, a transparent substrate and a light conversion film are provided on one surface of a light source, and the light conversion film may be formed with two layers each having a different maximum light emission wavelength, and may each be referred to as a first light conversion film and a second light conversion film. According to FIG. 1, the transparent substrate is shown to adjoin the second light conversion film, however, the transparent substrate may be disposed adjoining the first light conversion film. As the transparent substrate, glass, transparent plastic, a light guide plate, a diffuser plate, a prism sheet and the like may be used, and examples of the transparent plastic may include polyester, polycarbonate, polyolefin, polyimide and the like, and are not particularly limited.

In order to enhance light extraction efficiency, the light extraction plate may have scattered structure on the surface or inside, or may include two or more materials having different refractive indexes inside. For example, the light extraction layer may be prepared by coating a composition including scattered particles and a binder on a transparent substrate, and drying or curing the result. When necessary, a planarization layer may be further provided on the coating layer including the scattered particles and the binder. As another example, the light extraction layer may be prepared by forming an unevenness structure on a transparent substrate through micro-embossing. When necessary, a planarization layer may be further provided on the unevenness structure.

The light conversion device according to one embodiment of the present application may further include a transparent substrate and a light extraction plate consecutively on a surface of the light conversion film facing the light source. As described above, the light extraction plate may be prepared by coating a composition including scattered particles and a binder on a transparent substrate, and drying or curing the result, and may be provided either with the transparent substrate or alone.

According to another embodiment of the present application, the light conversion film of the light conversion device may further include light diffusion particles. The light diffusion particles may perform a role of uniformly diffusing light entered from a blue light emitting diode light source inside the light conversion film. The light diffusion particles may be dispersed into a polymer resin including one or more organic fluorescent dyes. The light conversion film including the light diffusion particles may provide fluorescence diffusion as well as light conversion, and may also be referred to as a light conversion fluorescence diffusion film. In the present specification, the light conversion film including the light diffusion particles may be referred to as a light conversion fluorescence diffusion film.

FIG. 2 illustrates a structure of the light conversion device according to one embodiment of the present application. When referring to FIG. 2, a light conversion film including light diffusion particles is formed with two layers, and on one surface of a light source, a transparent substrate, a second light conversion fluorescence diffusion film and a first light conversion fluorescence diffusion film may be consecutively disposed. However, as in FIG. 1, the transparent substrate may be provided adjoining the second light conversion fluorescence diffusion film, or may also be provided adjoining the first light conversion fluorescence diffusion film.

As the light diffusion particles, particles having a large refractive index difference with a polymer resin may be used, and examples thereof may include silica, zinc oxide, yttrium oxide, titanium dioxide, barium sulfate, alumina, fused silica, fumed silica, aluminum nitride, glass beads, zirconium dioxide, silicon carbide, silicon nitride, boron nitride and the like, but are not limited thereto, and materials known in the art may be used in one type, or as a mixture of two or more types.

The light conversion device may include a light extraction plate instead of light diffusion particles uniformly diffusing light entered from a light source inside the light conversion device. The light conversion device includes the transparent substrate, and a first light conversion film and a second light conversion film formed on one surface of the transparent substrate, including one or more types of wavelength converting materials, and formed with two layers having different maximum light emission wavelengths. The light conversion device may include a light extraction plate formed on the other surface of the transparent substrate or laminated by a gluing/adhesive layer formed on the other surface of the light extraction plate, and the structure including the light extraction plate is illustrated in FIG. 3. The light extraction plate is for conversion efficiency of the light conversion film, and is not particularly limited as long as it is known in the art. In FIG. 3, the transparent substrate and the light extraction plate are disposed adjoining the second light conversion film, however, the transparent substrate and light extraction plate may be disposed adjoining the first light conversion film as necessary. For example, on the light source, the second light conversion film, the first light conversion film, the transparent substrate, the gluing layer (or the adhesive layer) and the light extraction plate may be consecutively laminated.

In addition, the light conversion device includes a first light conversion film and a second light conversion film directly provided on one surface of the light extraction plate instead of the transparent substrate, including one or more types of wavelength converting materials, and formed with two layers having different maximum light emission wavelengths. The structure including the light extraction plate is illustrated in FIG. 4.

The light conversion film and/or the light conversion fluorescence diffusion film perform a role of converting light entered from a light source including a wavelength (color) selected in a region from near-ultraviolet to visible to light with a specific wavelength (color). For example, the light conversion film may perform a role of converting light entered from a blue light emitting diode (LED) light source to white light and emitting the light. Herein, the light conversion film and/or the light conversion fluorescence diffusion film may include an organic fluorescent dye as an organic fluorescent dye wavelength converting material capable of exhibiting excellent color purity and color gamut. The organic fluorescent dye has an advantage in that high quantum efficiency is obtained compared to existing quantum dots (QD), target light emission wavelengths are readily controlled, a light emission line width capable of achieving excellent color gamut is obtained, and prices are low.

The organic fluorescent dye as the wavelength converting material may use a dye absorbing light selected in a region from near-ultraviolet to visible, and emitting light having a wavelength different from the absorbed light. For example, as the organic fluorescent dye, a green light emitting fluorescent dye having a maximum light emission wavelength present between 500 nm to 550 nm and/or a red light emitting fluorescent dye having a maximum light emission wavelength present between 600 nm to 660 nm may be used either in one type or more each, or at the same time. Although not particularly limited thereto, examples of the organic fluorescent dye may include acridine-based, xanthene-based, arylmethane-based, coumarin-based, polycyclic aromatic hydrocarbon-based, polycyclic heteroaromatic-based, perylene-based, pyrrole-based, pyrene-based derivatives and the like. More specifically, dipyrromethene-based derivatives and the like may be used. These materials are one example of the organic fluorescent dye and various organic fluorescent dyes other than these materials may be used, however, the organic fluorescent dye is not limited thereto. Specifically, as the organic fluorescent dye, those having a full width at half maximum (FWHM) of 60 nm or less and molecular absorption coefficient of 50,000 $M^{-1}$ $cm^{-1}$ to 250,000 $M^{-1}$ $cm^{-1}$ may be used.

In the present specification, the full width at half maximum means, when converting light absorbed from an external light source to light with a different wavelength for emitting, a light emission peak width at the half of the maximum height in the maximum light emission peak of the emitted light. In the present specification, the full width at half maximum is measured in a film state. The full width at half maximum of a light emission peak in a film state of an organic fluorescent dye means measuring by irradiating light to a state prepared in a film form instead of a solution state by using the organic fluorescent dye alone or mixing with other components that do not affect full width at half maximum measurements. More specifically, all fluorescent dyes dissolved in polar solvents may be used, and cationic or anionic organic fluorescent dyes may be used although they are not divided into cationic, anionic and neutral dyes.

According to one example, the first light conversion film includes a green light emitting fluorescent dye having a maximum light emission wavelength present between 500 nm and 550 nm, and the second light conversion film includes a red light emitting fluorescent dye having a maximum light emission wavelength present between 600 nm to 660 nm. As a result, light absorbed from a single-colored LED light source may be converted to white light while passing through a plurality of light conversion films or light conversion fluorescence diffusion films.

As the light conversion film and/or the light conversion fluorescence diffusion film, a polymer film in which the organic fluorescent dyes or light diffusion particles are dispersed may be used. For example, the light conversion film may include a cured material of a composition including the organic fluorescent dye and a binder resin, and as necessary, a polymerizable monomer or a polymerization initiator. As the binder resin, a photocurable resin, a thermosetting resin, a thermoplastic resin and the like may be used, and may be a thermosetting resin, a thermoplastic resin and the like. Specific examples of the binder resin may include poly(meth)acryl-based such as polymethyl methacrylate, polycarbonate-based, polystyrene-based, polyarylene-based, polyurethane-based, styrene-acrylonitrile-based, polyvinylidene fluoride-based and polyvinylidene fluoride-based derivatives. Water-soluble polymers may be used. As the binder resin, one type may be used alone, or two or more types may be used together.

According to one example, the light source according to one embodiment of the present application is an edge-type light source, and may further include a light guide plate provided between the light source and the light conversion film. The light guide plate performs role of diffusing light received from the edge-type light source. As another example, the light source is a direct-type light source.

Another embodiment of the present application provides a backlight unit including the light conversion device according to the embodiments described above. The backlight unit may have constitutions known in the art except for the light conversion device. For example, a reflecting plate may be provided on a surface opposite to a surface of the light source or the light guide plate facing the light conversion device, or a light concentrating sheet, a luminance enhancing sheet or the like may be further provided on a side opposite to a surface of the light conversion film facing the light source or the light guide plate.

Another embodiment of the present application provides a display apparatus including the light conversion device or the backlight unit. The display apparatus may have constitutions known in the art except for using the light conversion device according to the embodiments of the present application. For example, a display module provided on one surface of the light conversion device or the backlight unit may be included. The display module may be a liquid crystal module including a thin film transistor and a color filter.

Hereinafter, embodiments described in the present specification are illustrated through examples. However, the following examples are for illustrating the present disclosure, and are not to limit the scope of the present disclosure.

Example 1

1 g of styrene-acrylonitrile (SAN) was introduced to 3 g of toluene so that the solid concentration became 25 parts by weight with respect to the total weight, and after sufficiently stirring the result, 0.5 parts by weight of a pyrrole-based green fluorescent dye (BODIPY) and 3 parts by weight of a titanium oxide-based light diffuser were each added with respect to 100 parts by weight of the SAN, and the result was stirred to prepare a green fluorescent dye composition. This composition was coated on a plastic substrate so that the thickness after drying became 10 μm, and then hot-air dried for 10 minutes in a 140° C. drying oven to prepare a green light conversion film.

Using the same method, a red fluorescent dye composition adding 0.03 parts by weight of a pyrrole-based red fluorescent dye (BODIPY) with respect to 100 parts by weight of the SAN was prepared. This was coated on the green light conversion film so that the thickness after drying became 10 μm and then hot-air dried for 10 minutes in a 140° C. drying oven to prepare a white light conversion film. The white light conversion film prepared as above was placed on a 750 nit blue LED panel installed in a thermos-hygrostat under a 60° C. temperature condition, and changes in the optical properties (light-fastness stability) over time were measured using a PR-730 spectroradiometer. Results of light-fastness stability for luminance and changes in the chrominance are shown in FIG. 5 and FIG. 6, respectively.

Example 2

Green and red fluorescent dye compositions were prepared in the same manner as in Example 1, except that a red light conversion film was first prepared by being coated on a plastic substrate and dried, and then a green light conversion film was coated on the red light conversion film and dried to prepare a white light conversion film. The white light conversion film prepared as above was placed on a 750 nit blue LED panel installed in a thermos-hygrostat under a 60° C. temperature condition, and changes in the optical properties (light-fastness stability) over time were measured using a PR-730 spectroradiometer. Results of light-fastness stability for luminance and changes in the chrominance are shown in FIG. 5 and FIG. 6, respectively.

Comparative Example 1

1 g of styrene-acrylonitrile (SAN) was introduced to 3 g of toluene so that the solid concentration became 25 parts by weight with respect to the total weight, and after sufficiently stirring the result, 0.5 parts by weight and 0.01 parts by weight of green and red fluorescent dyes (BODIPY), respectively, and 3 parts by weight of a titanium oxide-based light diffuser were each added with respect to 100 parts by weight of the SAN, and the result was stirred to prepare a composition for a white light conversion film. This was coated on a plastic substrate so that the thickness after drying became 15 μm, and then hot-air dried for 10 minutes in a 140° C. drying oven to prepare a white light conversion film.

The white light conversion film prepared as above was placed on a 750 nit blue LED panel installed in a thermos-hygrostat under a 60° C. temperature condition, and changes in the optical properties (light-fastness stability) over time were measured using a PR-730 spectroradiometer. Results of light-fastness stability for luminance and changes in the chrominance are shown in FIG. 5 and FIG. 6, respectively.

When referring to FIG. 5 and FIG. 6, it was seen that luminance of the light conversion device according to one embodiment of the present application had a significantly lower degree of decrease over time compared to the comparative example, and in the changes in the chrominance, stable changes over time were obtained compared to the comparative example as well, and accordingly, it was seen that light-fastness reliability of the light conversion device according to one embodiment of the present application was high.

Comparative Example 2

A white light conversion film was prepared in the same manner as in Comparative Example 1 except that yttrium aluminum garnet (YAG), an inorganic fluorescent substance, was used in 70% by weight instead of the green and red fluorescent dyes (BODIPY).

After installing the white light conversion film prepared as above on a 750 nit blue LED panel, thickness-dependent luminance and quantum efficiency measurement values obtained using a PR-730 spectroradiometer are shown in the following Table 1.

TABLE 1

|  | Luminance (nit) | Quantum Efficiency (QY, %) | Thickness (um) |
|---|---|---|---|
| Example 2 | 3003 | 92.1 | 8.2 |
|  | 3202 | 87.3 | 11.5 |
| Comparative Example 2 | 2427 | 82.9 | 10 |
|  | 3352 | 86.4 | 20 |

As shown in Table 1, it was seen that the light conversion film according to one embodiment of the present specification had high luminance and quantum efficiency with a small thickness compared to the case using an inorganic fluorescent substance. In addition, by controlling a concentration of the organic fluorescent substance of the light conversion film according to one embodiment of the present specification, high quantum efficiency was able to be obtained while having high luminance.

According to embodiments of the present disclosure, some of light entered from a blue light emitting diode is converted to green or red, or green and red having a narrow full width at half maximum in high efficiency through a light conversion device including a wavelength converting material, and as a result, color gamut and color purity of white light can be greatly enhanced. Particularly, with a structure formed with at least two or more layers having different maximum light emission wavelengths, light conversion efficiency may be more enhanced, and in addition thereto, optical properties such as light emission wavelength, full width at half maximum and light conversion efficiency can remain constant by reducing oxidation of the wavelength converting material caused by heat and light leading to no white balance decreases, and accordingly, a backlight of a liquid crystal display apparatus can be very stably driven.

What is claimed is:
1. A light conversion device comprising:
a light source; and
a light conversion film provided on one surface of the light source,
wherein the light conversion film includes a wavelength converting material converting a wavelength of light emitted from the light source and a light transmitting polymer resin in which the wavelength converting material is dispersed, and the light conversion film is formed with two or more layers and each of the layers independently has a different maximum light emission wavelength, and
wherein the light conversion film has at least a first light conversion film having a maximum light emission wavelength from 500 nm to 550 nm and a second light conversion film having a maximum light emission wavelength from 600 nm to 660 nm.

2. The light conversion device of claim 1, wherein the light source is a blue light emitting diode emitting blue light.

3. The light conversion device of claim 1, wherein the light conversion film is excited by light emitted from the light source.

4. The light conversion device of claim 1, wherein the wavelength converting material includes at least one of an organic fluorescent dye and an organic fluorescent pigment derived from an organic fluorescent dye, and a wavelength of light converted by the wavelength converting material has a full width at half maximum (FWHM) of 60 nm or less.

5. A light conversion device of claim 1, further comprising a transparent substrate or a light extraction plate on a surface of the light conversion film, such that the transparent substrate or the light extraction plate is between the light conversion film and the light source.

6. The light conversion device of claim 5, further comprising the transparent substrate and the light extraction plate consecutively on a surface of the light conversion film facing the light source.

7. The light conversion device of claim 5, wherein the light conversion film further includes light diffusion particles.

8. A backlight unit comprising the light conversion device of claim 5.

9. A display apparatus comprising the backlight unit of claim 8.

* * * * *